United States Patent
Muramatsu (10) Patent No.: US 11,520,140 B1
(45) Date of Patent: Dec. 6, 2022

(54) CAMERA AND VEHICLE

(71) Applicant: S&R PROJECT LLC, Tokyo (JP)

(72) Inventor: Fujio Muramatsu, Tokyo (JP)

(73) Assignee: S&R PROJECT LLC, Tokyo (JP)

( * ) Notice: Subject to any disclaimer, the term of this patent is extended or adjusted under 35 U.S.C. 154(b) by 0 days.

(21) Appl. No.: 17/828,620

(22) Filed: May 31, 2022

(30) Foreign Application Priority Data

Dec. 16, 2021 (JP) .............................. JP2021-203907

(51) Int. Cl.
| | | |
|---|---|---|
| G03B 17/56 | (2021.01) | |
| G02B 27/00 | (2006.01) | |
| G03B 9/08 | (2021.01) | |
| H04N 5/225 | (2006.01) | |

(52) U.S. Cl.
CPC ........... *G02B 27/0006* (2013.01); *G03B 9/08* (2013.01); *H04N 5/2252* (2013.01); *H04N 5/2254* (2013.01)

(58) Field of Classification Search
USPC .......................................... 396/452; 348/148
See application file for complete search history.

(56) References Cited

U.S. PATENT DOCUMENTS

| | | | |
|---|---|---|---|
| 9,880,382 B1 * | 1/2018 | Tippy ..................... | B60S 1/566 |
| 10,919,502 B2 | 2/2021 | Rousseau | |
| 2013/0209079 A1 | 8/2013 | Alexander et al. | |
| 2013/0219742 A1 * | 8/2013 | Field .................. | G02B 27/0006 34/565 |
| 2017/0361360 A1 * | 12/2017 | Li ....................... | G02B 27/0006 |
| 2018/0117642 A1 * | 5/2018 | Magee .................. | H01L 41/042 |

FOREIGN PATENT DOCUMENTS

| | | |
|---|---|---|
| CN | 202393971 U | 8/2012 |
| CN | 203858439 U | 10/2014 |
| CN | 113709341 A | 11/2021 |
| EP | 3064972 A1 | 9/2016 |
| JP | S5450350 U | 4/1979 |
| JP | H05344396 A | 12/1993 |
| JP | H06000934 U | 1/1994 |
| JP | H10294886 A | 11/1998 |
| JP | 2000027021 A | 1/2000 |
| JP | 2003209722 A * | 7/2003 |

(Continued)

OTHER PUBLICATIONS

Decision to Grant a Patent (with English translation) issued in corresponding Japan Patent Application No. 2021-203907 dated Apr. 5, 2022, 4 pages.

(Continued)

*Primary Examiner* — Clayton E. LaBalle
*Assistant Examiner* — Warren K Fenwick
(74) *Attorney, Agent, or Firm* — MH2 Technology Law Group, LLP (57) ABSTRACT

A camera with a low maintenance burden is provided. A camera (1) includes a housing (2) having an opening (21), a lens (3) accommodated in the housing (2) to collect light entering through the opening (21), a shutter (4) that opens and closes the opening (21), and a contact member (5) attached to an inner surface of the shutter (4) to come in contact with the lens (3). The contact member (5) comprises a magnetic material and is attracted to the shutter (4) with a magnetic force from the magnetic material.

6 Claims, 7 Drawing Sheets

(56) References Cited

FOREIGN PATENT DOCUMENTS

| | | |
|---|---|---|
| JP | 2003209722 A | 7/2003 |
| JP | 2019053096 A | 4/2019 |
| KR | 20040019146 A | 3/2004 |

OTHER PUBLICATIONS

Notice of Reasons for Refusal (with English translation) issued in corresponding Japan Patent Application No. 2021-203907 dated Feb. 18, 2022, 6 pages.
Combined Search and Examination Report dated Aug. 16, 2022 for related GB Patent Application No. 2209999.8, 8 Pages.
Examination Report dated Sep. 16, 2022 for related AU Patent Application No. 2022205154, 5 pages.
Office Action dated Oct. 4, 2022 for related CA Patent Application No. 3,164,684, 6 pages.

\* cited by examiner

CAMERA AND VEHICLE

CROSS-REFERENCE TO RELATED APPLICATIONS

This application claims priority to Japanese Application No. 2021-203907 filed 16 Dec. 2021, the entire disclosure of which is hereby incorporated by reference in its entirety.

BACKGROUND

Technical Field

The present invention relates to an outdoor camera, and in particular to a camera mountable externally on a vehicle.

Description of the Background

Cameras mounted externally on vehicles are likely to have dirt on the camera lenses and thus include shutters (e.g., Patent Literature 1).

CITATION LIST

Patent Literature

Patent Literature 1: Japanese Unexamined Utility Model Application Publication No. 6-934

BRIEF SUMMARY

However, while the shutters are open, the camera lenses are exposed to wind and rain. The camera lenses are thus to be wiped frequently to remove dirt. This takes time and effort.

In response to the above issue, one or more aspects of the present invention are directed to a camera with a low maintenance burden.

In response to the above issue, the aspects of the present invention are as described below.

Aspect 1

A camera, comprising:

a housing having an opening:

a lens accommodated in the housing to collect light entering through the opening;

a shutter configured to open and close the opening; and a contact member attached to an inner surface of the shutter to come in contact with the lens wherein the contact member comprises a magnetic material and is attracted to the shutter with a magnetic force from the magnetic material.

Aspect 2

The camera according to aspect 1, wherein the contact member comprises rubber.

Aspect 3

The camera according to any one of aspect 1 or aspect 2, further comprising:

a heater configured to heat the lens.

Aspect 4

The camera according to aspect 3, wherein the heater is buried in the contact member.

Aspect 5

The camera according to aspect 3, wherein the heater includes a light source configured to emit infrared rays.

Aspect 6

A vehicle, comprising:

the camera according to any one of aspects 1 to 5.

The above aspects of the present invention reduce the maintenance burden.

DETAILED DESCRIPTION

One or more embodiments of the present invention will now be described with reference to the accompanying drawings. The present invention is not limited to the embodiments described below.

Overall Structure

Figure 1:
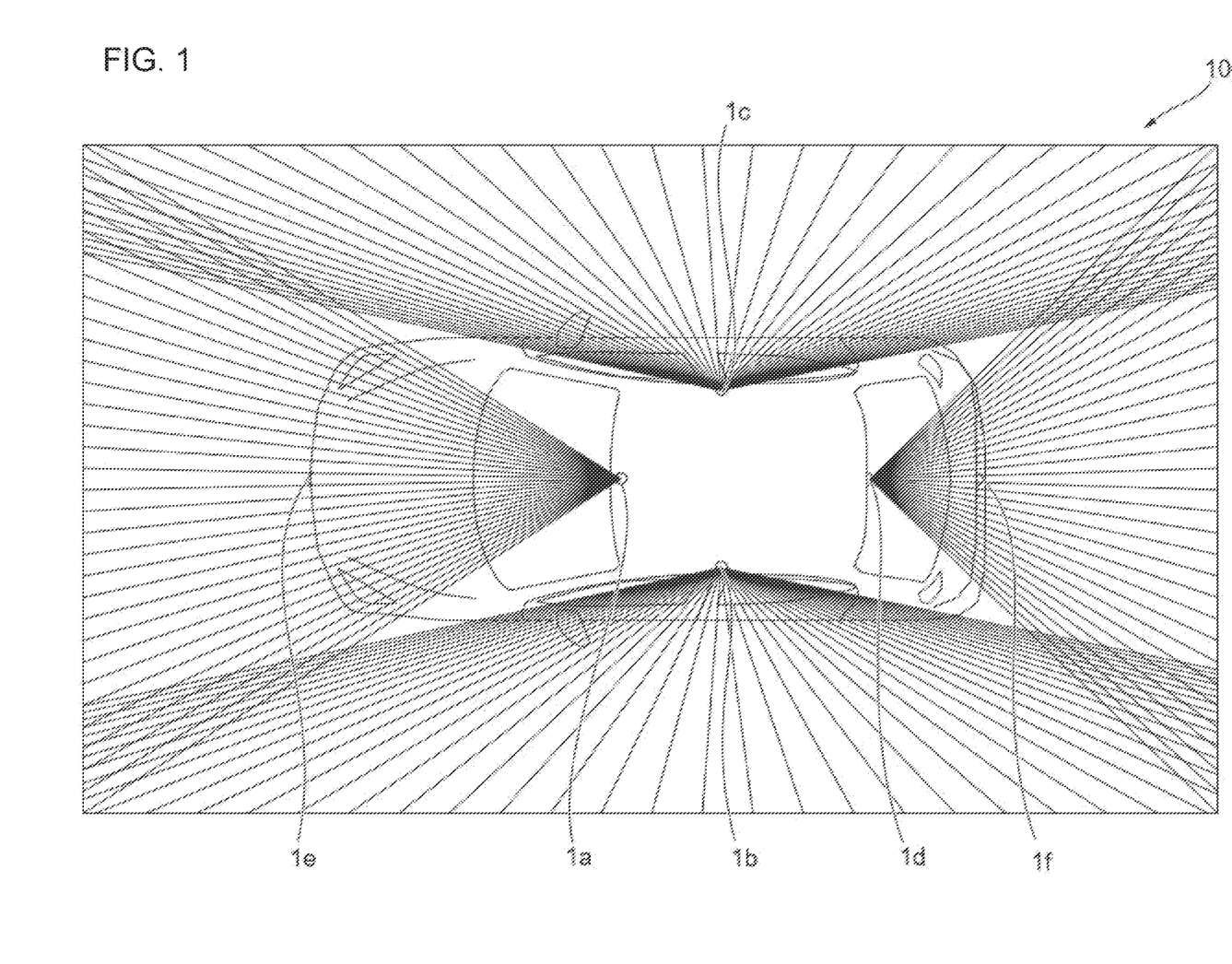
FIG. 1 is a plan view of a vehicle.

FIG. 1 is a plan view of a vehicle 100 according to one embodiment of the present invention. The vehicle 100 is a sedan passenger car. The vehicle 100 includes cameras 1a, 1b, 1c, and 1d and auxiliary cameras 1e and 1f externally on the vehicle body.

The four cameras 1a, 1b, 1c, and 1d are located on the roof of the vehicle 100. More specifically, the camera 1a is at the front of the roof, the camera 1b is at the left of the roof, the camera 1c is at the right of the roof, and the camera 1d is at the rear of the roof. In FIG. 1, the areas indicated with lines extending radially from the cameras 1a, 1b, 1c, and 1d each represent the imaging area of the corresponding camera. The auxiliary camera 1e is located near the front registration number plate. The auxiliary camera 1f is located near the rear registration number plate.

The cameras 1a, 1b, 1c, and 1d and the auxiliary cameras 1e and 1f have the same structure. The cameras 1a, 1b, 1c, and 1d and the auxiliary cameras 1e and 1f may hereafter be referred to as cameras 1 when they are not distinguished from one another.

Camera Structure

Figure 2A:
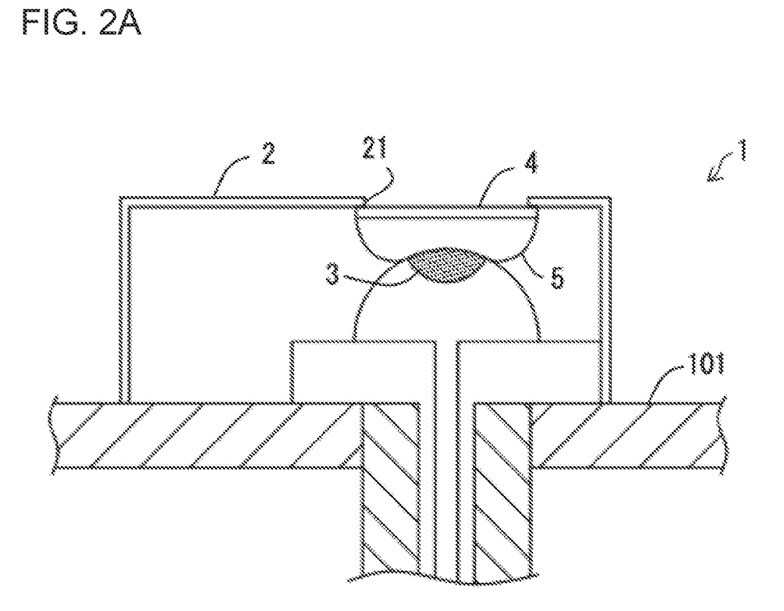
FIGS. 2A and 2B are cross-sectional views of a camera.
Figure 2B:
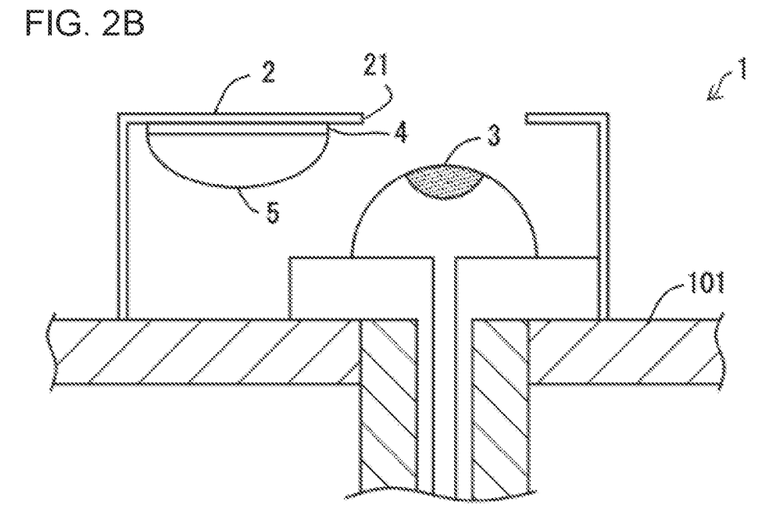
Figure 3A:
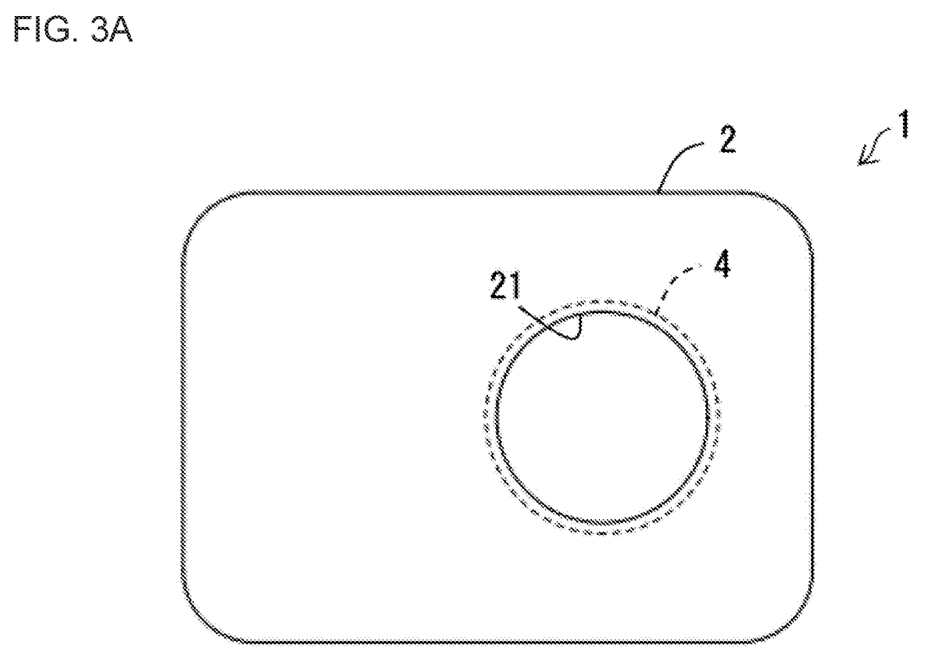
FIGS. 3A and 3B are plan views of the camera.
Figure 3B:
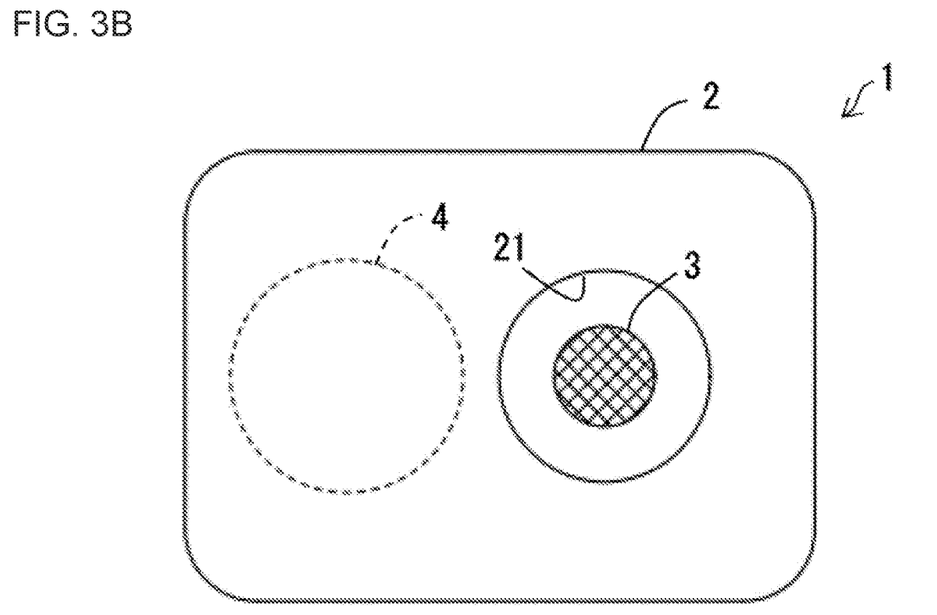

FIGS. 2A and 2B each are a cross-sectional view of each camera 1. FIGS. 3A and 3B each are a plan view of the camera 1.

The camera 1 includes a housing 2, a lens 3, a shutter 4, and a contact member 5. The camera 1 is mounted on a body surface 101 of the vehicle 100. The housing 2 is substantially rectangular and has a circular opening 21 in the upper surface. The lens 3 is accommodated in the housing 2 to collect light entering through the opening 21.

The shutter 4 opens and closes the opening 21. The shutter 4 is slidable in the lateral direction in the figures by a drive unit (not shown). In FIGS. 2A and 3A, the shutter 4 is closed. In FIGS. 2B and 3B, the shutter 4 is open. In the present embodiment, the shutter 4 is open in response to the camera 1 being activated and is closed in response to the camera 1 being stopped. The shutter 4 is a single disk. The shutter 4 may have any shape in a plan view.

The contact member 5 is attached to the inner surface of the shutter 4 to be in contact with the lens 3. The contact member 5 has a semi-elliptical cross section and protrudes in the housing 2 obtusely. In the present embodiment, when the shutter 4 is closed as shown in FIG. 2A, the contact member 5 comes in contact with the lens 3. Thus, any dirt (including dust) on the surface of the lens 3 is removed by the contact member 5 as the shutter 4 is open and closed.

The contact member 5 is formed from a flexible elastic material to avoid scratching the lens 3. In the present embodiment, the contact member 5 is formed from rubber. The contact member 5 in contact with the lens 3 thus deforms when being pressed against the lens 3 and comes in contact with a large part of the lens surface.

The contact member 5 also contains a magnetic material and thus is attracted to the shutter 4 with the magnetic force from the magnetic material. The contact member 5 can be manufactured by melting rubber ferrite powder mixed with magnetic powder and hardening the molten mixture into a predetermined shape. The magnetic material may have a magnetic force that retains the contact member 5 in position to the shutter 4 when the contact member 5 comes in contact with the lens 3.

The contact member 5 may be attached to the shutter 4 with an adhesive, whereas the contact member 5 magnetically attracted to the shutter 4 is easily attachable to and detachable from the shutter 4. The surface of the contact member 5 may be waterproof.

In the present embodiment, any dirt on the lens 3 is automatically wiped off by the contact member 5 as the shutter 4 is open and closed. This eliminates frequent manual wiping of the lens 3 and reduces the maintenance burden.

Figure 4A:
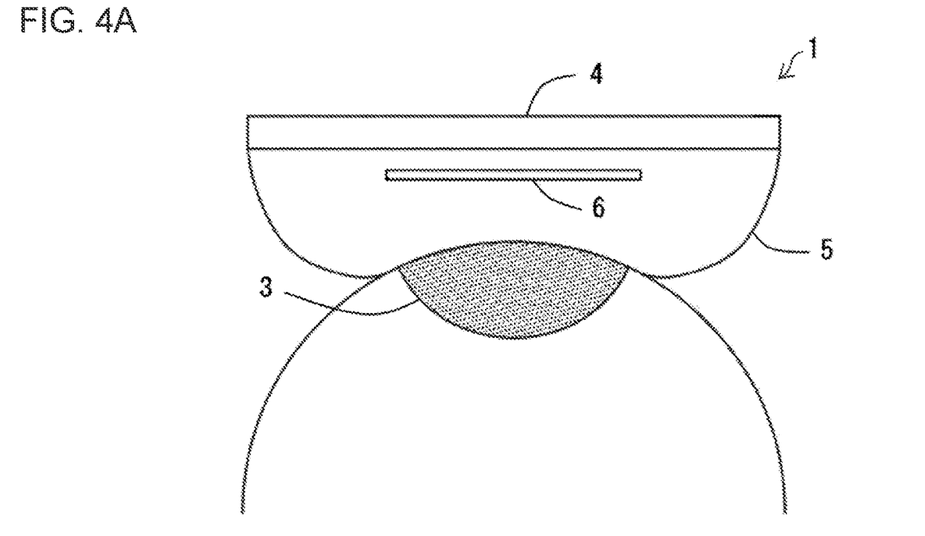
FIG. 4A is a partially enlarged view of the camera.
Figure 4B:
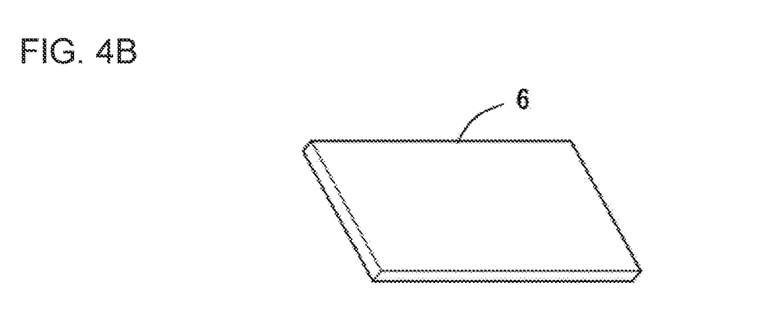
FIG. 4B is a perspective view of a heater chip.

FIG. 4A is a partially enlarged view of the camera 1. A heater 6 is buried in the contact member 5. As shown in FIG. 4B, the heater 6 is a flat heater chip. In some embodiments, the heater 6 may have any shape or size to be buried in the contact member 5. The heater 6 is connected to wiring (not shown). The heater 6 and the wiring are incorporated in the contact member 5 during manufacture.

The heater 6 may be turned on and off at any time. In the present embodiment, the heater 6 is in an on-state while the shutter 4 is open (while the camera 1 is in operation) and is in an off-state in a normal state in which the shutter 4 is closed (while the camera 1 is not in operation). This structure allows rain or snow entering the housing 2 while the shutter 4 is open to evaporate under heat from the heater 6. This also allows any moisture remaining after the shutter 4 is closed to evaporate under the residual heat from the heater 6. The structure eliminates complicated on-off control and thus is power-saving.

Figure 5:
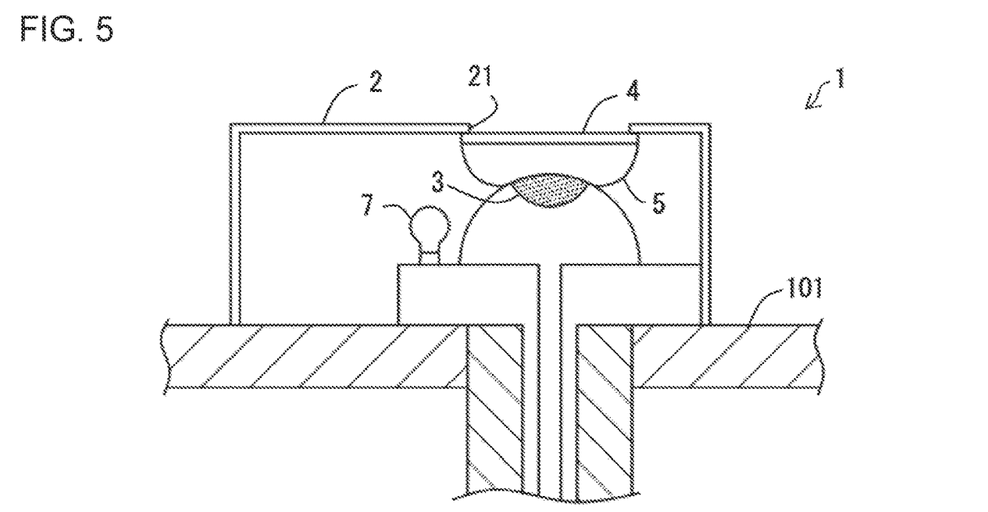
FIG. 5 is a cross-sectional view of a camera according to a modification.

FIG. 5 is a cross-sectional view of a camera 1 according to a modification. In FIG. 5, a heater 7 is located near the lens 3. The heater 7 is a light source (miniature bulb) that emits infrared rays, which cause moisture in the housing 2 to evaporate. The heater 7 may be turned on and off at any time. In the present embodiment, the heater 7 is in an on-state while the shutter 4 is open and is in an off-state in a normal state in which the shutter 4 is closed.

The heater 7 may be used in place of or in combination with the heater 6 shown in FIG. 4. The heater 7 may be an incandescent lamp.

Controlling Cameras

Figure 6:
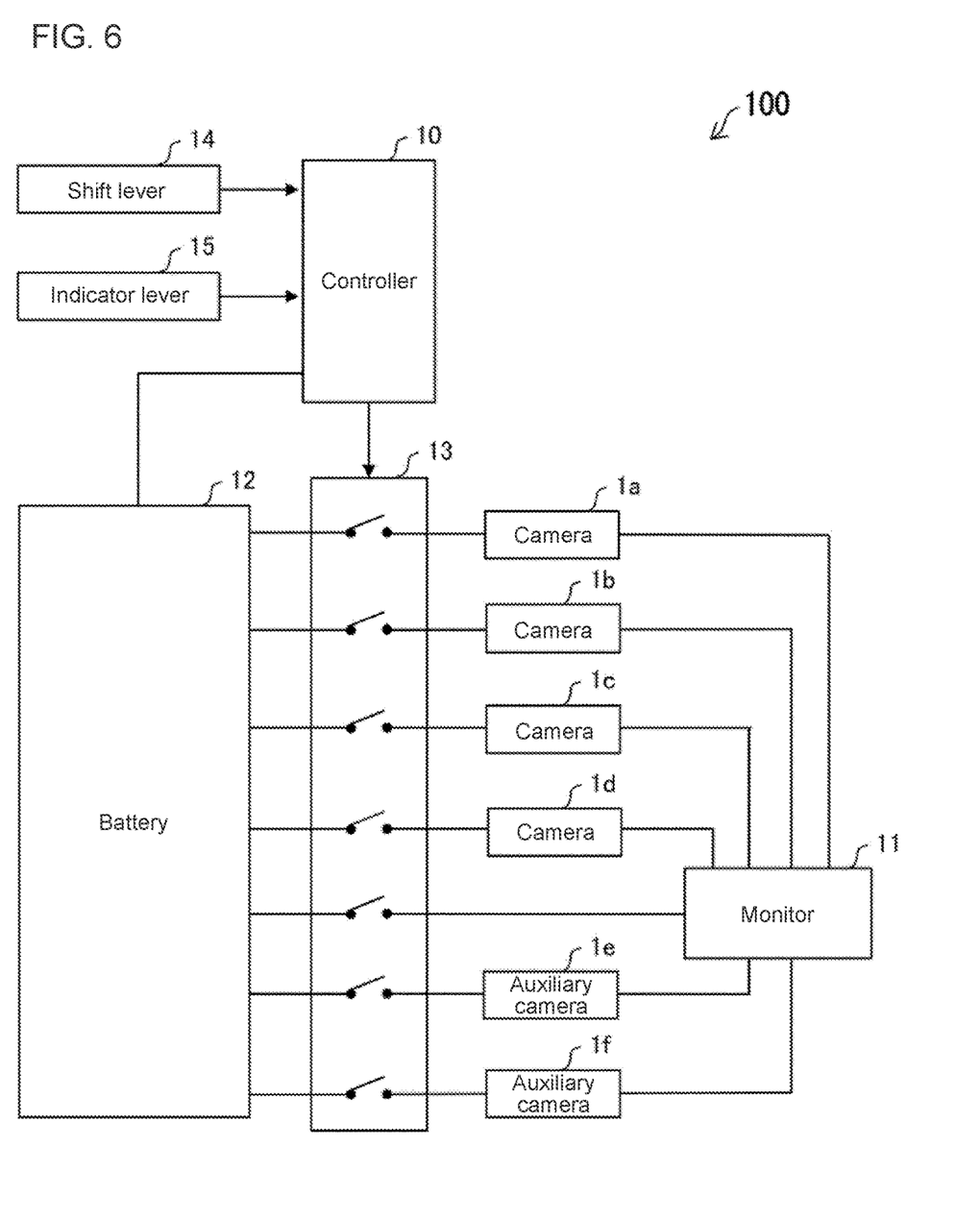
FIG. 6 is a functional block diagram of the vehicle.

FIG. 6 is a functional block diagram of the vehicle 100 according to the present embodiment. The vehicle 100 includes the cameras 1a, 1b, 1c, and 1d, the auxiliary cameras 1e and 1f, a controller 10, a monitor 11, a battery 12, a switch unit 13, a shift lever 14, and an indicator lever 15.

The controller 10 is a computer that controls the overall operation of the vehicle 100. The controller 10 may be implemented as hardware such as a logic circuit or as software through execution of a predetermined program.

The monitor 11 is installed at a position easily viewable to the driver in the vehicle 100. The monitor 11 can display images captured by the cameras 1a, 1b, 1c, and 1d and the auxiliary cameras 1e and 1f. The cameras 1a, 1b. 1c, and 1d, the auxiliary cameras 1e and 1f, and the monitor 11 are connected to the battery 12 through the respective switches in the switch unit 13. The controller 10 turns on and off the switches in the switch unit 13 in response to, for example, the driver's operation performed on the shift lever 14 and the indicator lever 15. When one switch is turned on, the camera connected to the switch is activated and an image captured by the camera appears on the monitor 11.

Figure 7:
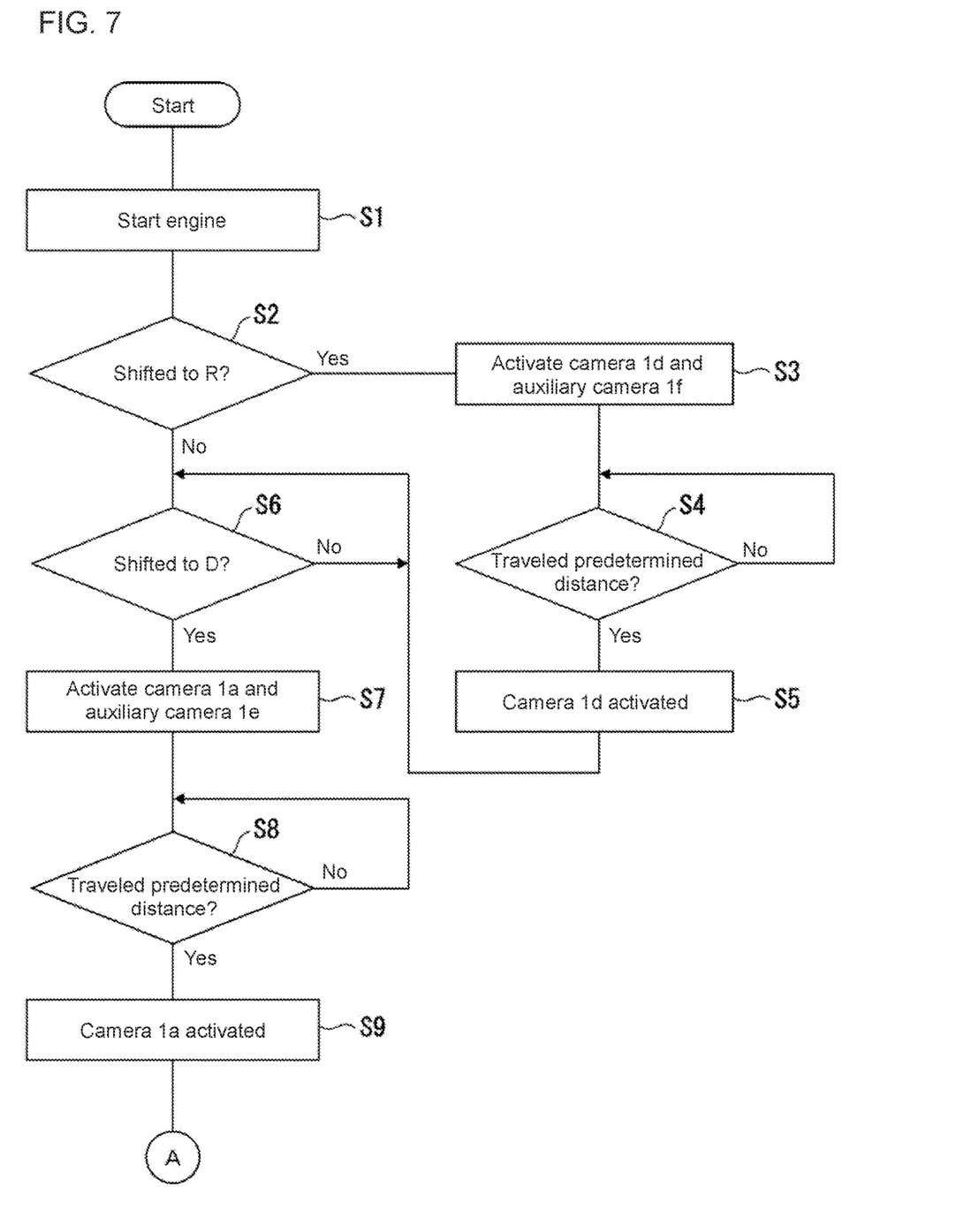
FIG. 7 is a flowchart of a part of an example procedure to activate cameras and auxiliary cameras.
Figure 8:
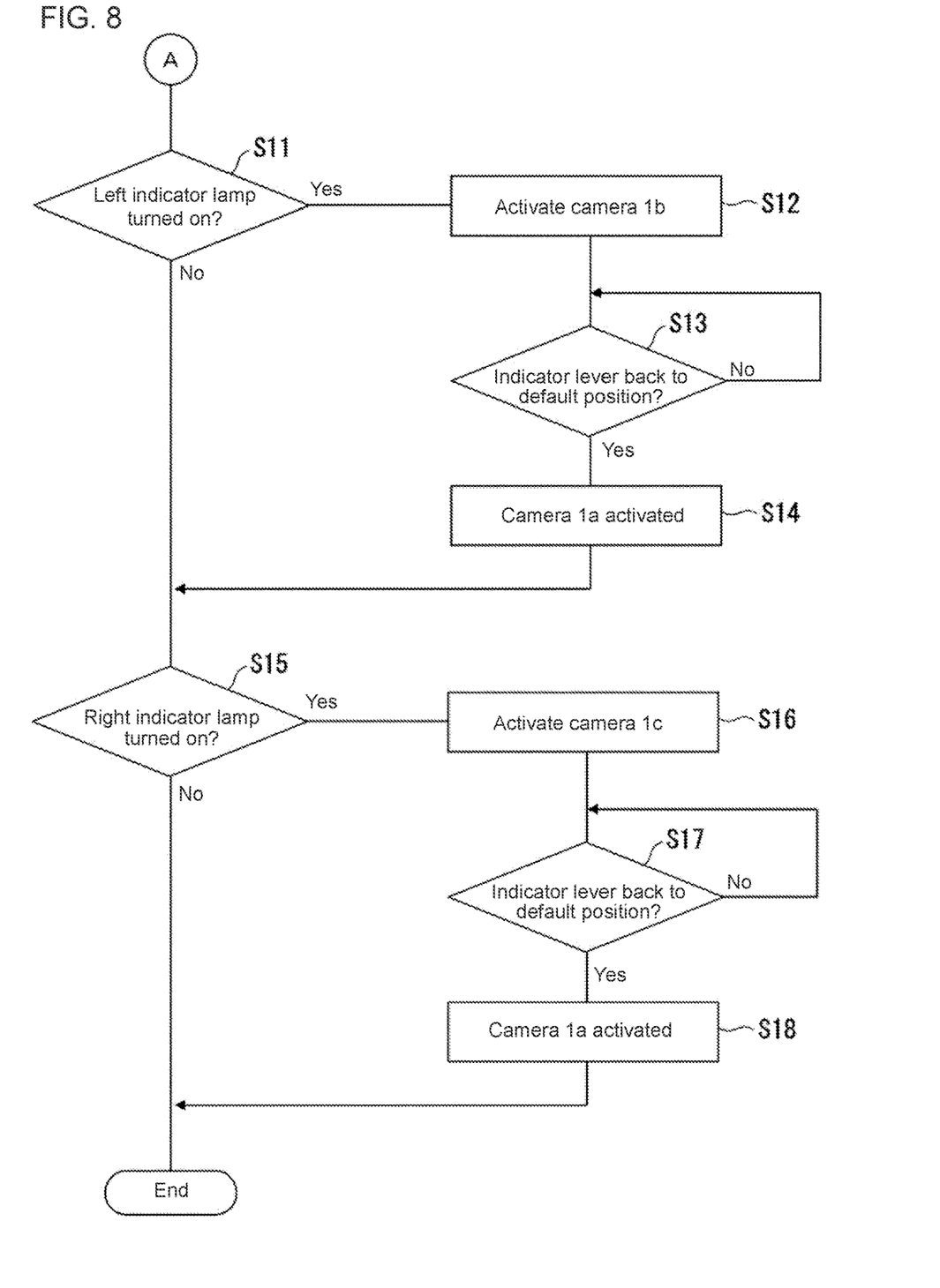
FIG. 8 is a flowchart of a part of the example procedure to activate the cameras and the auxiliary cameras.

In the present embodiment, the controller 10 controls the cameras 1a, 1b, 1c, and 1d and the auxiliary cameras 1e and 1f in the manner described below to prevent, in particular, accidents involving young children being run over. FIGS. 7 and 8 each area flowchart of an example procedure to activate the cameras 1a. 1b, 1c, and 1d and the auxiliary cameras 1e and 1f.

After the engine is started in step S1 in response to the shift lever 14 being shifted to the reverse (R) position (Yes in step S2), the camera 1d and the auxiliary camera 1f are activated to cause the monitor 11 to display images of the area in the rear of the vehicle 100 and the area directly under the rear portion of the vehicle 100 (step S3). The image from the auxiliary camera 1f allows the driver, before starting the vehicle 100, to notice any young child hidden in the area directly under the rear portion of the vehicle 100, which is a blind spot for the camera 1d or mirrors.

In response to the vehicle 100 traveling a predetermined distance (e.g., 3 to 5 m) (Yes in step S4), the auxiliary camera 1f is stopped and the camera 1d alone remains activated (step S5).

In response to the shift lever 14 being shifted to the drive (D) position (Yes in step S6), the camera 1a and the auxiliary camera 1e are activated to cause the monitor 11 to display images of the area in front of the vehicle 100 and the area directly under the front portion of the vehicle 100 (step S7). The image from the auxiliary camera 1e allows the driver, before starting the vehicle, to notice any young child hidden in the area directly under the hood of the vehicle 100, which is a blind spot for the camera 1a or mirrors.

In response to the vehicle 100 traveling a predetermined distance (e.g., 3 to 5 m) (Yes in step S8), the auxiliary camera 1e is stopped and the camera 1a alone remains activated (step S9).

In response to the driver operating the indicator lever 15 to flash the left indicator lamp (Yes in step S11), the camera 1b is activated to cause the monitor 11 to display an image of the area on the left of the vehicle 100 (step S12). In response to the indicator lever 15 being placed back to the default position (Yes in step S13), the camera 1b is stopped and the camera 1a alone remains activated (step S14).

In response to the driver operating the indicator lever 15 to flash the right indicator lamp (Yes in step S15), the camera 1c is activated to cause the monitor 11 to display an image of the area on the right of the vehicle 100 (step S16). In response to the indicator lever 15 being placed back to the default position (Yes in step S17), the camera 1c is stopped and the camera 1a alone remains activated (step S18).

Young children, who particularly lack awareness toward possible dangers, can hide in an area likely to be a blind spot for the vehicle 100. In the present embodiment, before the vehicle 100 starts moving, the auxiliary cameras 1e and 1f cause the monitor 11 to display images of the areas directly under the front and rear portions of the vehicle, which are blind spots for the cameras 1a, 1b, 1c, and 1d. This allows the driver to notice any young child in a blind spot and prevent an accident involving a young child being run over. The vehicle 100 traveling a predetermined distance from the starting point has passed by the blind spots at the starting point. The auxiliary camera 1e or 1f is thus stopped, and the monitor 11 displays the image from the camera 1a or 1d alone. In some embodiments, a recognition technique using artificial intelligence (AI) may be used to identify any young child or other objects appearing on the monitor 11. A voice notification or other notifications may then be provided to the driver.

SUPPLEMENTARY REMARKS

The embodiments disclosed herein should not be construed to be restrictive but may be modified within the spirit and scope of the claimed invention. The technical features disclosed in the embodiments may be combined in other embodiments within the technical scope of the invention.

INDUSTRIAL APPLICABILITY

Although the camera according to one or more embodiments of the present invention may be used for vehicles, the camera may also be used as, for example, an outdoor surveillance camera.

REFERENCE SIGNS LIST 1 camera
1a camera
1b camera
1c camera
1d camera
1e auxiliary camera
1f auxiliary camera
2 housing
21 opening
3 lens
4 shutter
5 contact member
6 heater
7 heater
10 controller
11 monitor
12 battery
13 switch unit
14 shift lever
15 indicator lever
100 vehicle
101 vehicle body surface

What is claimed is:

1. A camera, comprising:
   a housing having an opening;
   a lens accommodated in the housing to collect light entering through the opening;
   a shutter configured to open and close the opening; and
   a contact member attached to an inner surface of the shutter to come in contact with the lens,
   wherein the contact member comprises a magnetic material and is attracted to the shutter with a magnetic force from the magnetic material.

2. The camera according to claim 1, wherein the contact member comprises rubber.

3. The camera according to claim 1, further comprising: a heater configured to heat the lens.

4. The camera according to claim 3, wherein the heater is buried in the contact member.

5. The camera according to claim 3, wherein the heater includes a light source configured to emit infrared rays.

6. A vehicle, comprising:
   the camera according to claim 1.

* * * * *